United States Patent [19]
De Parny et al.

[11] Patent Number: 5,273,239
[45] Date of Patent: Dec. 28, 1993

[54] MODULABLE HELICOPTER-CARRIED NACELLE TO BE PLACED ON OVERHEAD CABLES

[75] Inventors: Robert D. De Parny, Cadolive; Gérard Moudin, Albertville; Philippe Ruaux, Rognac, all of France

[73] Assignee: Electricite de France Service National, France

[21] Appl. No.: 792,943

[22] Filed: Nov. 15, 1991

[30] Foreign Application Priority Data

Nov. 19, 1990 [FR] France ................. 90 14365

[51] Int. Cl.$^5$ ............................................. B64D 9/00
[52] U.S. Cl. ............................ 244/118.1; 244/137.1; 182/142; 182/150; 14/69.5
[58] Field of Search .......... 244/118.5, 118.1, 137.4, 244/137.1, 1 R; 14/69.5; 104/112, 87; 182/14, 187, 222, 129, 150, 132, 141, 145, 142, 152, 2; 254/134.3 R

[56] References Cited

U.S. PATENT DOCUMENTS

| | | | |
|---|---|---|---|
| 1,115,775 | 11/1914 | Bisbach | 14/695 |
| 3,390,640 | 7/1968 | Couttet et al. | 104/112 |
| 3,666,045 | 5/1972 | Olsen | 14/69.5 |
| 3,702,124 | 11/1972 | Highland | 182/14 |
| 3,863,736 | 2/1975 | McWilliams | 244/137.1 |
| 3,907,066 | 9/1975 | Newton | 182/142 |
| 4,422,528 | 12/1983 | Patterson | 182/150 |
| 4,473,011 | 9/1984 | Wuschek | 104/112 |
| 4,478,312 | 10/1984 | Kurtgis | . |
| 4,673,059 | 6/1987 | Kurtgis | 182/150 |

FOREIGN PATENT DOCUMENTS 1584014  8/1990  U.S.S.R. .................. 254/134.3

*Primary Examiner*—Galen L. Barefoot
*Attorney, Agent, or Firm*—Pearne, Gordon, McCoy & Granger

[57] ABSTRACT

The present invention provides nacelles or cars (10) and a catwalk or platform (30) which make it possible to instantaneously place one or more operators (2) on overhead cables (1) for carrying out different work activities. Each nacelle (10) is a preferably latticed, metallic structure having pivoting walls (8) for extending the field of action of each operator. Each nacelle has means (5) for attaching to the cables (1). The catwalk (30) can be opened out and is located at the ends of each of the nacelles (10). The present invention is particularly adapted for used in the maintenance and arrangement of electric cables.

13 Claims, 3 Drawing Sheets

MODULABLE HELICOPTER-CARRIED NACELLE TO BE PLACED ON OVERHEAD CABLES

BACKGROUND OF THE INVENTION

1. Field of the Invention

The invention relates to working on and maintaining overhead cables, such as those used for the transportation and distribution of electric power. The invention can also apply to cables of transportation means, such as cable railways and other cabins carried by cables.

2. Description of the Related Art

Once installed, all these overhead cables require numerous maintenance, repair and arrangement operations. Thus, within the framework of the maintenance and arrangement programs of the power distribution network, Electricite de France has to carry out numerous interventions. These include the installation of beacons or spacers for maintaining two cables at a constant distance from one another, the replacement of cable sleeves on conductor bunches, etc. require human intervention on the cables or the laying of these cables on the ground. The first type of intervention consists of climbing an adjacent pylon and then moving along the cables, which is obviously very dangerous. The second type of intervention is extremely long and expensive.

It is also very frequently necessary to place colored or self-luminous beacons having a diameter of approximately one meter on overhead cables, said beacons being used for clearly indicating the presence of these cables to aircraft and helicopters flying in air space close to the cables.

The invention aims at facilitating, improving and accelerating this type of intervention on any random type of overhead cable.

SUMMARY OF THE INVENTION

Therefore a first object of the invention is constituted by a modulable, helicopter-carried nacelle or car to be placed and suspended between two overhead cables spaced by a predetermined distance, the nacelle having a width which is slightly less than the said predetermined distance and incorporating means for fixing to the overhead cables. Therefore fast human intervention is possible on the overhead cables able to withstand the weight of such a nacelle.

The preferred construction of the nacelle according to the invention requires that the latter is mainly constituted by a parallelepipedic metallic structure having a floor to permit the presence of one or more operators, the fixing means being constituted by inverted slots for receiving the cables and positioned laterally with respect to the upper part of the structure.

Such a construction can advantageously be completed by hooks for enclosing the cable between them and the inverted slots in order to support the nacelle in the case of unforeseen and untimely movements of said cables.

The modulable character of the nacelle according to the invention is made possible by the fact that at least one of the two end walls is constituted by a metallic lattice mounted so as to pivot relative to the floor, so that it can be lowered and form an extension of the floor. Such an extension is advantageously completed at each end of the end walls by two positioning cables in order to limit the tilting or tipping of said end wall and the positioning thereof in the extension of the floor.

According to a feature of the invention, the end of the end walls is provided with an element for fixing to another fixing element of another structure, such as a catwalk or platform to be fixed to the nacelle.

The nacelle according to the invention can also have guide bars placed below the latter and forming a volume, whose cross-section progressively assumes the shape of the bottom of the nacelle in order to move aside the two overhead cables during the lowering of the nacelle between them. Preferably, two diametrically opposite guide bars are bulged in order to aid the rotation of the nacelle, while creating a helical movement.

In this case, it is also possible to use a retractable, vertical guide rod extending, in the extended position, the volume of the guide bars and which can be drawn out manually from a retracted position.

A second main object of the invention is a rigid catwalk constituted by a floor, limited by two ends and which is fixed by its two ends to two nacelles of the type described hereinbefore and incorporating floor fixing means placed at each floor end for fixing to the tilted end of an end wall of the two nacelles.

Preferably, said fixing means are constituted by holes in the floor of each nacelle to which the catwalk must be fixed and pins placed at the ends of the catwalk for placing in the said holes.

In its preferred construction, the catwalk is constituted by two metallic lattice parts mounted so as to pivot relative to one another in such a way that the catwalk can be retracted, means for locking the two parts in the open position being provided, while a gripping cable is suspended at each end of the catwalk, the latter being suspended on a helicopter for installation between two nacelles placed on two overhead cables.

BRIEF DESCRIPTION OF THE DRAWINGS

The invention is described in greater detail hereinafter relative to non-limitative embodiments and the attached drawings, wherein show.

DETAILED DESCRIPTION OF THE PREFERRED EMBODIMENT

Figure 1:
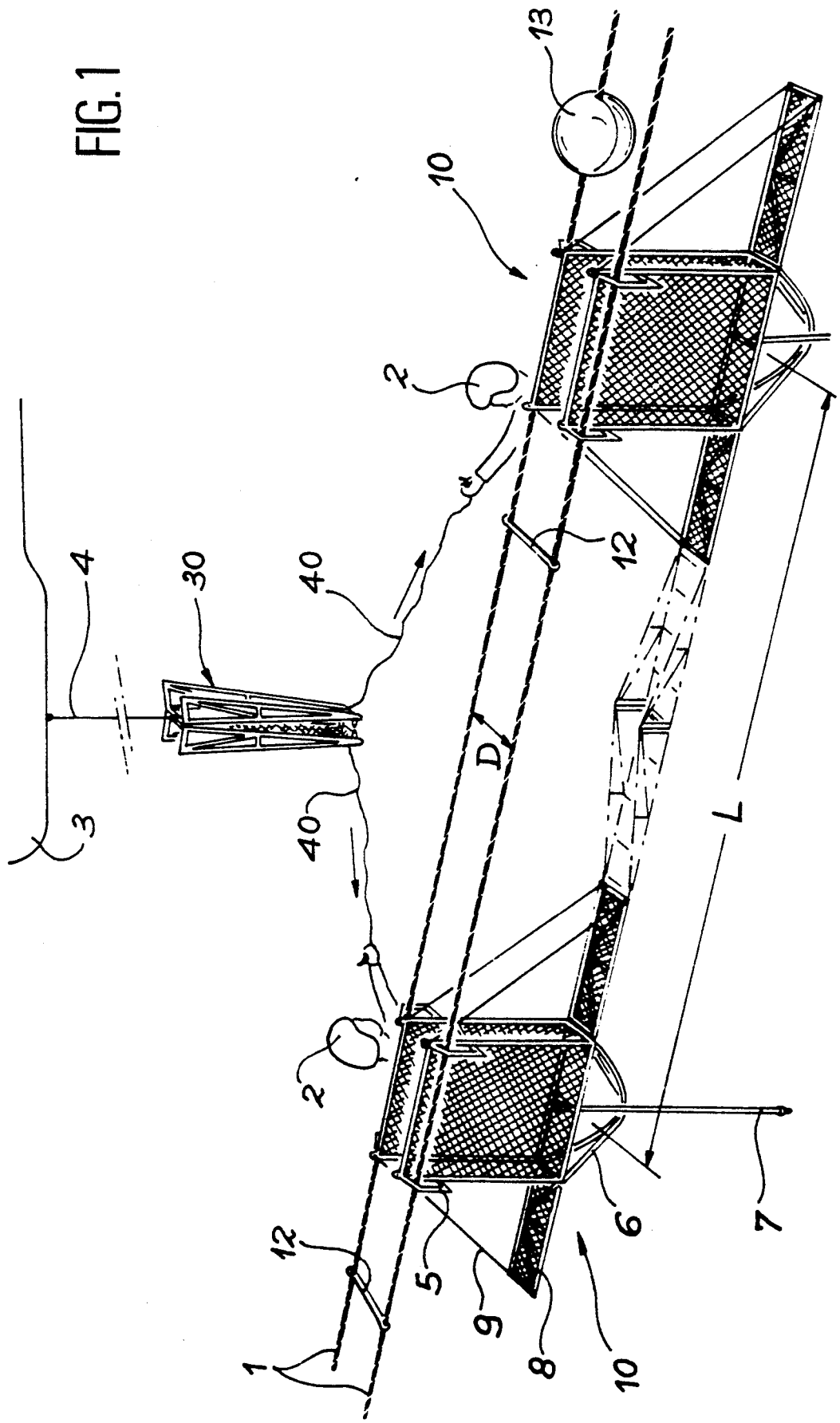
FIG. 1 A diagram relative to the use of two nacelles and the catwalk according to the invention.

FIG. 1 shows the main elements of the invention within the scope of their application. For this purpose it is possible to see a pair of parallel overhead cables 1, in this case electric power distribution cables, two operators 2 and a helicopter 3. These two overhead cables 1 can form part of a bundle of three or four cables. The equipment used is constituted by two modulable, helicopter-carried nacelles 10 and a retractable, helicopter-carried catwalk 30.

One of the main technical characteristics of the nacelle according to the invention is that it is carried by helicopter, i.e. it is positioned between the two cables 1 by means of a helicopter on which it is suspended by means of a rope. It is clear that one or two workers can work on the cables 1 and more precisely position objects, such as spacers 12 or signalling beacons 13, taking account of the air traffic in the area surrounding the cables 1. It should be noted that the distance D separating two cables 1 is known. Consequently, the nacelles are constructed with a width slightly less than said distance D, so as to be insertable between the two cables 1.

Nacelle

Figure 2:
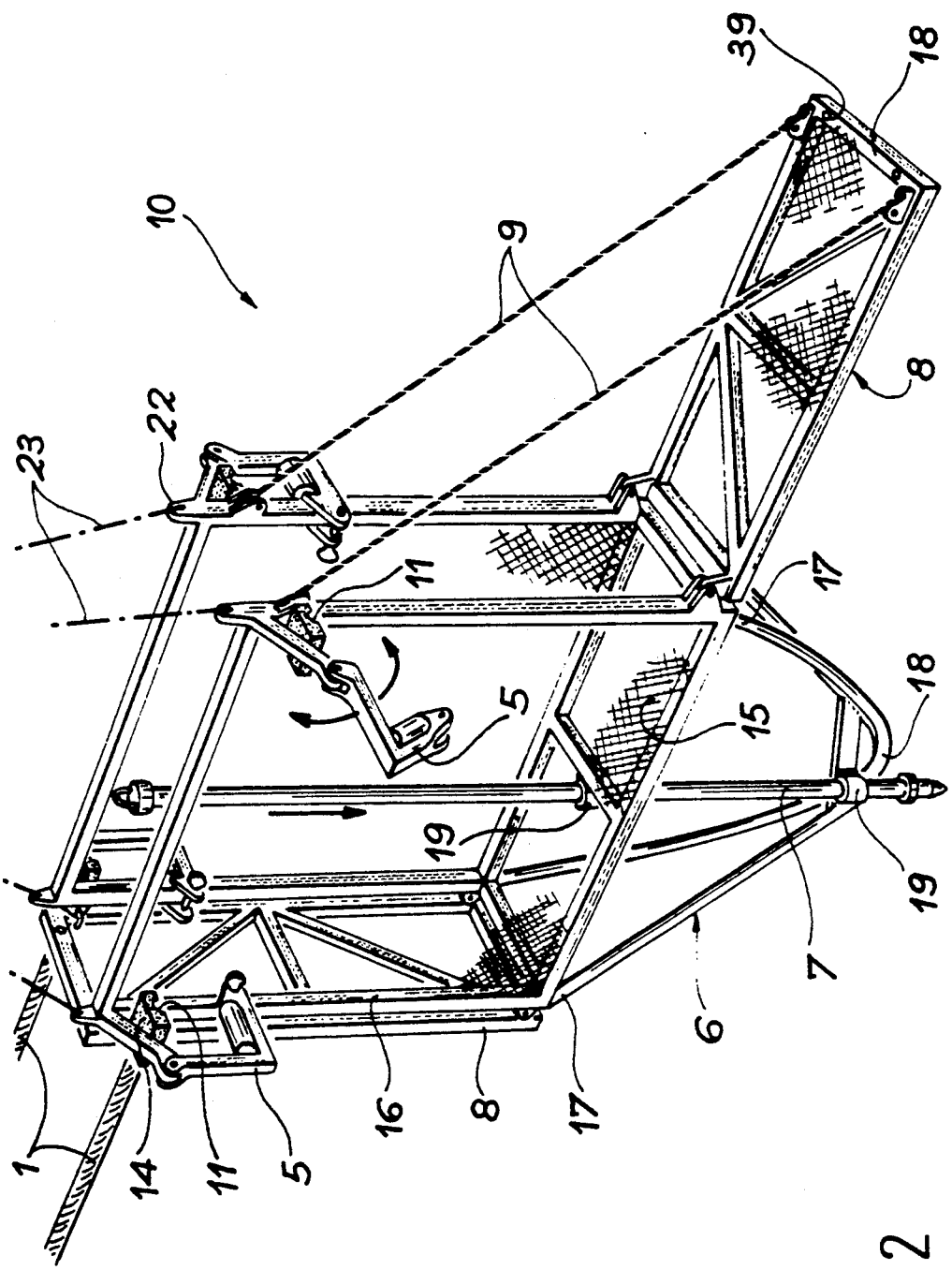
FIG. 2 A more detailed diagram of a nacelle according to the invention.

With reference to FIG. 2, it can be seen that a nacelle 10 has means for fixing to the cables 1. The non-limitative embodiment of the fixing means shown in FIG. 2 reveals slots 11 made in the fixing parts 14 laterally fixed with respect to the nacelle 10 in its upper part. Each slot 11 is open towards the bottom, so that the nacelle 10 can be placed on cables 1, which can be placed within the slots 11. Several fixing parts 14 incorporating slots 11 are consequently provided on either side of the nacelle 10.

The nacelle 10 is shown in the form of a parallelepiped. This is a relatively practical embodiment for the positioning of one or more operators between two cables 1, but other configurations could be considered.

The nacelle 10 is mainly constituted by a metallic structure formed by angle irons welded so as to offer a rigidity permitting the carrying of one or two operators and a certain amount of equipment. It is supplemented by one or more walls preferably in metallic lattice form. Therefore a floor 15 can be formed to allow the operators to move about.

The nacelle 10 is suspended on rope slings 23 from the helicopter by means of rings 22 welded to the upper part of the metallic structure of the nacelle. If the nacelle 10 is parallelepipedic, these rings 22 are placed at the four upper corners.

The fixing system constituted by slots 11 can advantageously be completed by detachable hooks 5. Thus, the latter are formed by an arm bent at 90° and slightly projecting from the fixing parts 14 carrying the slots 11 and mounted so as to pivot about a horizontal axis parallel to the cables 1. In an open position, as is illustrated by one of the hooks 5, the latter can pivot so as to move away from the nacelle 10. In the closed position, they are turned downwards, so as to trap the cable 1 between the fixing part 14, a vertical post 16 of the nacelle and the actual hook 5. Thus, the nacelle 10 is fixed to the cables 1, even in the case of untimely and unforeseen movements thereof, one of them being able to pass out of the slot 11 in which it is located without bringing the nacelle 10 into a dangerous, unstable position.

The nacelle 10 has two end walls 8, whereof the right-hand wall is shown in a horizontal position. Thus, the retractable nature of the nacelle 10 is due to the fact that at least one of its end walls 8 is mounted so as to pivot at the end of the floor 15 about an axis horizontal to the end of the floor 15. Thus, an end wall 8 can, once opened out, constitute an extension of said floor 15. The locking in the opened out position of the end walls 8 can be brought about by two positioning cables 9, fixed on the one hand to the end 18 of the end wall 8 and on the other to the upper part of the metallic structure of the nacelle 10. These positioning cables 9 are preferably placed on the sides of the nacelle 10, so as not to impede the movements of operators. This is only one example of a rotation blocking means and other systems can be obtained, in particular mechanical abutments fixed to the nacelle level with the articulation of the pivoting end wall 8.

As shown in FIG. 1, the nacelles 10 have been lowered by helicopter 3 between the two cables 1. In order to facilitate this operation, according to the invention elements 6, 7 for the guidance of the nacelles 10 between the two cables 1 are provided. FIG. 2 shows these guidance means in greater detail. Thus, the parallelepipedic shape of the nacelle 10 requires that it is positioned parallel to the cables 1 before being lowered. Guide bars 6 fixed below the floor 15 permit this orientation of the nacelle 10. The upper part 17 of each guide bar 6 is fixed to one corner of the floor 15. The four guide bars 6 are joined at an apex or point 18 forming in this way a pentahedron. In general terms, the volume formed by these guide bars 6 must have a cross-section evolving from the floor 15 on moving away from the apex 18. When the nacelle 10 is lowered, the apex 18 is the first portion located level with the cables 1. If this apex 18 is introduced between the two cables 1, no matter what the orientation of the nacelle 10, as the guide bars 6 are inclined, the nacelle 10 will be oriented during its lowering between the two cables 1 so as to assume the correct position. To facilitate the rotation of the nacelle 10 when the latter is crosswise relative to the cables 1, two of the four guide bars 6, which diametrically opposite, can be slightly outwardly bulged, whereas the two others are straight.

In order to complete these guidance means, there is a retractable guide rod 7 extending the pentahedron formed by the guide bars 6. This guide rod 7 is mounted so as to slide in the centre of the nacelle 10, so that it extends the apex or point 18, when the latter is out of the nacelle 10. It is mounted so as to slide in slide rings 19 fixed to the structure of the nacelle 10. The guide rod 7 can be manually controlled by the operator during the lowering of the nacelle 10.

This guide rod 7 is used when the nacelle 10 is above the cables 1 and before the point 18 reaches the level of said cables 1. When the operator 2 considers that the apex 18 is in the direction in space between the two cables 1, he extends the guide rod 7, which then penetrates between the two cables 1 and enables the nacelle 10 to be maintained in the direction of said space.

Catwalk

The second important element of the invention is constituted by the catwalk 30, shown in continuous line form in its folded-up position suspended by the rope 4 on the helicopter 3 in FIG. 1. In FIG. 1, the said catwalk 30 is shown in mixed-line form opened out between the two nacelles 10. Its function is obviously to connect the two floors 15 of the nacelles 10 in order to constitute a relatively large work bridge along the cables 1.

Figure 3:
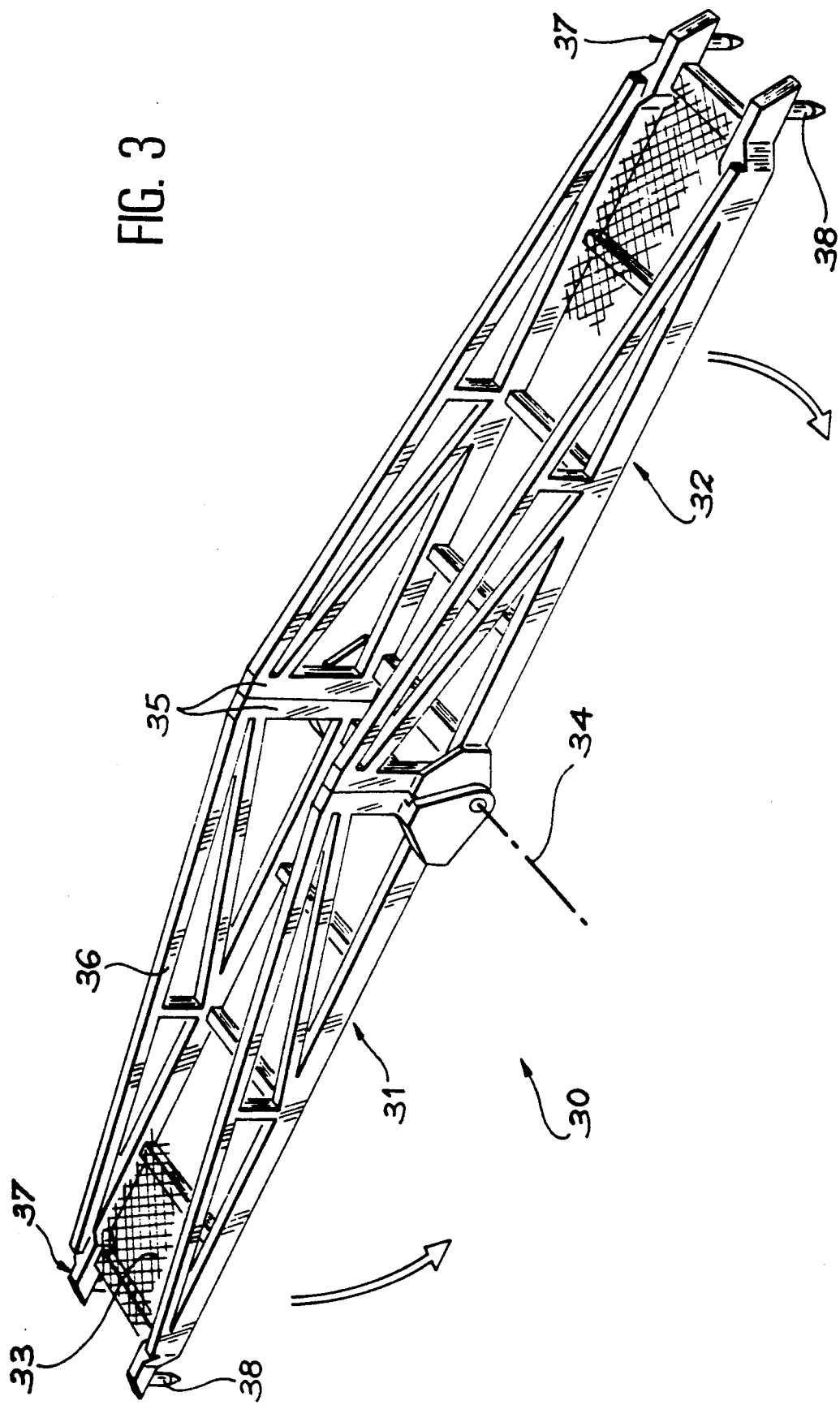
FIG. 3 A detailed diagram of a catwalk according to the invention.

With reference to FIG. 3, said catwalk is constituted by two parts 31, 32 mounted so as to pivot relative to one another around a horizontal axis 34. They are both formed by a welded metallic structure mainly incorporating a metallic lattice 33. When they are opened out, their respective metallic lattices 33 form a single horizontal floor. The blocking in the opened out position takes place with the aid of vertical posts 35 installed perpendicular to the metallic lattices 33 level with the pivoting axis 34 and which bear against one another in said opened out position. These posts 35 also support transverse bars 36, thus rigidifying the catwalk structure.

Fixing means to the nacelles 10 are provided at the ends 37 of the catwalk 30 and are preferably constituted by pins 38 perpendicular to the metallic lattices 33 and which are introduced into corresponding holes 39 made at the end 18 of the end walls 8 of the nacelles 10 (FIG. 2). The spacing of the holes 39 in the end walls 8 of the nacelles 10 have the same spacing as the pins 38 of the catwalk 30.

Installation procedure

As shown in FIG. 1, the installation procedure for the elements according to the invention is as follows:

lowering by the helicopter of the nacelles 10 between the two cables 1 at a distance L determined as a function of the dimensions of the nacelles 10 and the catwalk 30;

moving in by helicopter the catwalk 30 in the folded-up position; opening out the catwalk by means of two cables 40 by operators 2 on the nacelles 10;

and positioning of the opened-out catwalk 30 by means of fixing pins 38 and holes 39.

The nacelles 10 and the catwalk 30 according to the invention make it possible to fit cable sleeves or spacers 12 between the two cables 1 of a bundle of several cables. It also permits the positioning of signalling beacons 13, repair or reinforcement sleeves, or other objects on the cables 1 and to carry out any relatively minor maintenance or repair operation.

The nacelles 10 can obviously be used in an individual, punctiform manner, without having to use another nacelle or catwalk.

We claim:

1. A modulable, helicopter-carried nacelle (10) comprising a structure having a floor for permitting the presence of one or more operators, said nacelle being suspended between and supported by two overhead cables (1) which are spaced a predetermined distance (D) from one another, said nacelle having a width slightly less than the predetermined distance (D) and incorporating means for fixing the nacelle to the cables (1).

2. A nacelle (10) according to claim 1, wherein the fixing means are constituted by slots (11) opening downwardly for receiving the cables (1) and positioned laterally with respect to the metallic structure, the nacelle having end walls (8).

3. A nacelle (10) according to claim 2, wherein the inverted slots (11) are completed by hooks (5) for enclosing each cable (1) in order to ensure the supporting of the nacelle (10) in the event of untimely movement of the cables (1).

4. A nacelle (10) according to claim 2, wherein at least one of the two end walls (8) is constituted by a metallic lattice and is mounted so as to pivot with respect to the floor (15), so that it can be lowered and form an extension of said floor (15).

5. A nacelle (10) according to claim 4, wherein two positioning cables (9) are provided at each end in order to position the end walls (8) in the extension of the floor (15).

6. A nacelle (10) according to claim 4, further comprising means for fixing the pivoted end walls (8) to a fixing element of another structure (30) suspended on cables (1) and which must be fixed to the nacelle (10).

7. A nacelle (10) according to any one of the preceding claims, further comprising guide bars (6) placed below the floor (15) of the nacelle (10) and forming a volume whose cross-section progressively assumes the shape of the floor (15) of the nacelle (10) in order to move aside the two overhead cables (1) during lowering of the nacelle (10) thereon.

8. A nacelle (10) according to claim 7, wherein the diametrically opposite guide bars (6) are bulged in order to aid the rotation of the nacelle (10).

9. A nacelle (10) according to claim 7, further comprising a retractable, vertical guide rod (7) which, in the extended position, extends the volume defined by the guide bars (6) and which can be manually drawn out from a retracted position 10. A nacelle according to claim 1, further comprising a rigid catwalk (30) constituted by a metallic lattice (33) limited by two ends (37) and adapted for fixing at its two ends (37) to two nacelles, said catwalk (30) including means for suspending the catwalk from a helicopter and means for fixing the metallic lattice (33) to the end (18) of a pivoted end wall (8) of the nacelle (10).

11. A nacelle having a catwalk according to claim 10, wherein the catwalk fixing means comprise pins (38), said pins being positioned perpendicularly to the metallic lattice (33) at the ends (37) of the catwalk (30), holes being (39) provided at the ends (18) of the end walls (8) of the nacelles (10) for receipt of said pins.

12. A nacelle having a catwalk according to claim 10 or 11, comprising two metallic lattice portions (31, 32) mounted so as to pivot relative to one another so that the catwalk (30) can be retracted, and incorporating means (35) for blocking said two portions (31, 32) in the open position, an opening-out cable (40) being suspended on each end (37) of the catwalk (30), said opening out cables allowing an operator to pivotally move said two metallic lattice portions relative to one another and thereby move said catwalk from a retracted position to an open position.

13. A nacelle according to claim 8, further comprising a retractable, vertical guide rod (7) which, in the extended position, extends the volume defined by the guide bars (6) and which can be manually drawn out from a retracted position.

* * * * *

UNITED STATES PATENT AND TRADEMARK OFFICE
CERTIFICATE OF CORRECTION

PATENT NO. : 5,273,239

DATED : December 28, 1993

INVENTOR(S) : Robert De Forges De Parny

It is certified that error appears in the above-identified patent and that said Letters Patent is hereby corrected as shown below:

```
On title page, item [75] delete
    "Robert D. De Parny" and insert --Robert De Forges De
    Parny--.

Column 5, Claim 3, line 43, delete "movement" and insert --
    movements--.
```

Signed and Sealed this

Twenty-fourth Day of May, 1994

Attest:

BRUCE LEHMAN

Attesting Officer     Commissioner of Patents and Trademarks